(12) United States Patent
Fischer et al.

(10) Patent No.: US 10,261,778 B2
(45) Date of Patent: Apr. 16, 2019

(54) METHOD FOR UPDATING AN OPERATING FUNCTION OF A SENSOR, AND SENSOR MODULE

(71) Applicant: CONTINENTAL AUTOMOTIVE GMBH, Hannover (DE)

(72) Inventors: Frank Fischer, Regensburg (DE); Marc Pflugmann, Rain (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/028,569

(22) PCT Filed: Sep. 19, 2014

(86) PCT No.: PCT/EP2014/069968
§ 371 (c)(1),
(2) Date: Apr. 11, 2016

(87) PCT Pub. No.: WO2015/051982
PCT Pub. Date: Apr. 16, 2015

(65) Prior Publication Data
US 2016/0253169 A1    Sep. 1, 2016

(30) Foreign Application Priority Data
Oct. 11, 2013 (DE) .......... 10 2013 220 523

(51) Int. Cl.
G06F 9/44 (2018.01)
G06F 8/654 (2018.01)
G06F 21/57 (2013.01)

(52) U.S. Cl.
CPC ............ *G06F 8/654* (2018.02); *G06F 21/572* (2013.01); *G06F 21/575* (2013.01)

(58) Field of Classification Search
CPC ....................................................... G06F 8/654
See application file for complete search history.

(56) References Cited

U.S. PATENT DOCUMENTS 5,056,354 A * 10/1991 Kuwana ................ B60T 8/1764
73/146
5,218,862 A * 6/1993 Hurrell, II ............ B60C 23/061
340/444
(Continued)

FOREIGN PATENT DOCUMENTS

DE    202008014764 U1    5/2009
DE    102009008350 A1    9/2010
(Continued)

OTHER PUBLICATIONS

Yang Xu, et al.: "Design of Online Upgrade System for the Software of Vehicle ECU based on CAN-Bus". International Journal of Advancements in Computing Technology. vol. 5. No. 1. Jan. 15, 2013 (Jan. 15, 2013). pp. 79-87. XP055156795. ISSN: 2005-8039. DOI: 10.4156jijact.vol5.issue1.10, the whole document.
(Continued)

*Primary Examiner* — Chameli Das
(74) *Attorney, Agent, or Firm* — Laurence A. Greenberg; Werner H. Stemer; Ralph E. Locher

(57) ABSTRACT

A method for updating an operating function of a sensor, which has a memory that has a boot memory area for storing a boot function and an operating memory area for storing an operating function. The method has the following steps: execution of the boot function; checking whether an update for the operating function of the sensor needs to be performed; if an update for the operating function of the sensor does need to be performed, performing a plausibility check; if the plausibility check was successful, updating the operating function of the sensor such that data for an up-to-date operating function are received from an external unit and the data are written to the operating memory area. The reception of the data and the writing of the data to the operating memory area take place in parallel.

17 Claims, 3 Drawing Sheets

(56) References Cited

U.S. PATENT DOCUMENTS

| | | | | |
|---|---|---|---|---|
| 5,564,108 | A * | 10/1996 | Hunsaker | A61B 5/14551 702/65 |
| 5,629,873 | A * | 5/1997 | Mittal | B60C 23/003 152/415 |
| 7,164,982 | B1 | 1/2007 | Chinnadurai et al. | |
| 8,543,839 | B2 | 9/2013 | Sibert | |
| 8,659,412 | B2 | 2/2014 | Deniau | |
| 2001/0008083 | A1 * | 7/2001 | Brown | B60C 23/0408 73/146 |
| 2002/0190853 | A1 * | 12/2002 | Nigon | B60C 23/0413 340/448 |
| 2003/0001734 | A1 * | 1/2003 | Schofield | B60C 23/0401 340/442 |
| 2004/0103340 | A1 * | 5/2004 | Sundareson | G06F 11/1433 714/6.3 |
| 2006/0027404 | A1 * | 2/2006 | Foxlin | G01C 21/16 178/18.06 |
| 2007/0279203 | A1 * | 12/2007 | Thomas | B60C 23/068 340/447 |
| 2009/0106990 | A1 * | 4/2009 | Harrill | B60G 7/006 33/288 |
| 2010/0250911 | A1 | 9/2010 | Trebbels et al. | |
| 2011/0140876 | A1 * | 6/2011 | Deniau | B60C 23/0408 340/445 |
| 2011/0154311 | A1 * | 6/2011 | Acker | G06F 8/71 717/168 |
| 2012/0229512 | A1 * | 9/2012 | Hayashi | A63F 13/214 345/649 |
| 2013/0073799 | A1 * | 3/2013 | Abe | F02D 41/249 711/103 |
| 2013/0082404 | A1 * | 4/2013 | Kajigaya | H01L 23/498 257/777 |
| 2013/0167159 | A1 * | 6/2013 | Ricci | G06F 9/54 719/319 |
| 2014/0195107 | A1 * | 7/2014 | Park | B60C 23/0416 701/34.4 |

FOREIGN PATENT DOCUMENTS

| | | |
|---|---|---|
| DE | 102010062115 A1 | 6/2011 |
| WO | 2009156302 A1 | 12/2009 |

OTHER PUBLICATIONS

Zuo-Xun Wang, et al.: "Design and Implement of Tire Monitonng System Based on ZigBee". Wireless Communications. Networking and Mobile Computing. 2009. WICOM '09. 5th International Conference on. IEEE. Piscataway. NJ. USA. Sep. 24, 2009 (Sep. 24, 2009). pp. 1-4. XP031555463.

M. Fosler, Ross AN247: "A CAN Bootloader for PIC18F CAN Microcontrollers." Dec. 31, 2003 (Dec. 31, 2003). XP055156803. Retrieved from the Internet: URL:http://ww1.microchip.comjdownloadsjen/AppNotesj00247a.pdf [retrieved on Dec. 4, 2014].

* cited by examiner

METHOD FOR UPDATING AN OPERATING FUNCTION OF A SENSOR, AND SENSOR MODULE

BACKGROUND OF THE INVENTION

Field of the Invention

The invention relates to a method for updating an operating function of a sensor, for example a tire pressure sensor of a motor vehicle, in particular to a method for updating an operating function of a sensor in an energy-saving and rapid manner, to a computer program product of this type and to a corresponding sensor module.

A sensor is a technical component which can record particular physical or chemical properties and/or the material nature of its environment qualitatively or quantitatively as a measurement variable. These variables are recorded using physical or chemical effects and are converted into an electrical signal which can be processed further.

For example, motor vehicles are being equipped more and more with tire pressure monitoring systems (TPMS) which comprise tire pressure sensors for monitoring the tire air pressure in vehicles in order to prevent tire defects on account of an excessively low tire air pressure and therefore to reduce the number of accidents which can be attributed to defective tires.

The document DE 10 2009 008 350 A1 discloses a vehicle wheel having an apparatus for recording and transmitting at least one measurement signal which characterizes the state of the vehicle tire, such as the tire air pressure and/or the tire air temperature, having at least one sensor module which is supplied with electrical energy by an energy supply device and comprises at least one tire air pressure sensor and/or at least one tire air temperature sensor.

However, in the case of such tire pressure monitoring systems, it proves to be disadvantageous that updating of the software in the sensor, that is to say of an operating function of the sensor, for example in order to add or update particular program functions, is associated with a high energy consumption, which, in the case of a long-lasting update process, may culminate in the energy supply device, for example a battery, being emptied. However, replacing the energy supply device is associated with a comparatively very large amount of effort, on account of the installation situation of the tire pressure monitoring system in the motor vehicle, compared with the benefit achieved by the sensor.

In this case, the update process is usually carried out by receiving data relating to a current operating function from an external unit and then storing the received data in, that is to say writing the received data to an operating memory area of the tire pressure monitoring system. However, since all data relating to the current operating function are first of all received in this case before the writing process starts, such an update process results in delays and, in particular, a long update period, which in turn has a negative effect on the energy consumption.

BRIEF SUMMARY OF THE INVENTION

The object of the present invention is to specify an energy-saving and rapid method for updating an operating function of a sensor, a computer program product of this type and a corresponding sensor module.

This object is achieved by means of the subject matter of the independent claims. The dependent claims relate to advantageous developments.

According to one embodiment of the invention, this object is achieved by means of a method for updating an operating function of a sensor having a memory which has a boot memory area for storing a boot function and an operating memory area for storing a current operating function. In this case, the method has the following steps: the boot function is first of all executed and a check is then carried out in order to determine whether the operating function of the sensor is intended to be updated. If the operating function of the sensor is intended to be updated, a plausibility check is carried out. If the plausibility check was successful in this case, the operating function of the sensor is updated in such a manner that data relating to a current operating function are received from an external unit and are written to the operating memory area, the reception of the data and the writing of the data to the operating memory area taking place in a parallel manner.

Therefore, in the case of an update process for updating an operating function of a sensor, the basic idea is consequently to initiate, that is to say start, a writing process in parallel with the reception of data relating to a current operating function of the sensor before all data relating to a current operating function have been completely received.

A boot function is generally understood as meaning special software which is usually loaded from a bootable medium by the firmware of a computer and is then executed. The boot function then loads further parts of an operating system of the computer, usually a kernel. The external unit may also be a special RF communication module, in particular a production or programming station which is connected to the vehicle network in a wired or wireless manner, for example for diagnostic and/or updating purposes during production or in a workshop, and transmits data to individual control devices of the motor vehicle and receives data from the control devices.

Such a method has the advantage that it can be used to update an operating function of the sensor in an energy-saving and rapid manner. As a result of the fact that the writing of current data to the operating memory area is not initiated only when all data relating to a current operating function have been received, but rather is started in parallel with the reception of the data relating to a current operating function, delays caused by the update process can be avoided and the duration of the update process can therefore be considerably reduced. This in turn results in a lower energy consumption of the update process, which is associated with an increased service life of an energy supply device which supplies the sensor with electrical energy. The step of checking whether the operating function of the sensor is intended to be updated can also ensure that the update process is carried out only when this appears to be necessary. This makes it possible to shorten and accelerate the starting process when loading the operating function of the sensor and to further reduce the energy consumption. The code of the operating function generally does not change and more up-to-date versions for the operating function are not continuously provided, with the result that it is normally not necessary to carry out an update during each starting process. If this is now dispensed with, the starting process is significantly accelerated and the measured value for a sensor can be provided more quickly, for example.

In this case, the sensor may be a tire pressure sensor, a tire temperature sensor and/or a tire load sensor of a vehicle, in particular of a motor vehicle, for example a motorcycle, an automobile or a truck. The sensor can therefore be selected from the group consisting of a tire pressure sensor, a tire temperature sensor and a tire load sensor of a vehicle. In the case of tire pressure sensors of a motor vehicle in particular, such an energy-saving and fast update process, in comparison with update processes which have a high energy consumption, proves to be advantageous, especially since replacement of the energy supply device proves to be difficult in the case of tire pressure sensors since tire pressure monitoring systems are usually installed inside the tires of a motor vehicle and replacement of the energy supply device would consequently require the corresponding tire to be removed.

In this case, the boot function can also be started from the external unit. Consequently, the update process can be initiated precisely when the sensor is connected to a production or programming station in order to add or update particular program functions, for example for diagnosis and/or updating purposes during production or in a workshop.

The plausibility check may also comprise an authentication check and a compatibility check. In this case, the authentication check is used to authenticate the accessing entity, for example a production or programming station, in order to allow the authenticated unit to have further actions. In this case, the authentication check can be implemented by means of known components and functions, for example by inputting a password or using a key, with the result that this can be achieved or implemented here in a simple manner and without a large amount of effort without requiring complicated and costly alterations to hardware and/or software components. The compatibility check in turn can be used to check the compatibility of the data relating to a current operating function with the sensor module. This can be implemented, for example, by means of a special compatibility device which possibly calls up an associated incompatibility routine which may likewise be stored in the memory of the sensor.

Furthermore, it is also possible for the data relating to a current operating function to be transmitted in encrypted form, thus allowing the security to be increased further. The process in which clearly readable data are converted into an "illegible" character string, that is to say a character string which cannot be easily interpreted, with the aid of an encryption method is called encryption. In this case, one or else more keys are used as decisively important parameters of the encryption.

According to one embodiment, the operating memory area may consist of a multiplicity of memory blocks. The step of updating the operating function of the sensor may involve in this case sequentially writing blocks of the data relating to a current operating function to the multiplicity of memory blocks in such a manner that data relating to a current operating function which are intended to be written to a block of the multiplicity of memory blocks are received and data which are currently stored in the block of the multiplicity of memory blocks are deleted at the same time and data relating to a current operating function which should be written to the block of the multiplicity of memory blocks are then written to the block of the multiplicity of memory blocks. It is known practice to use virtual memory management means which subdivide the physically available memory into memory blocks (organized as pages or segments) or memory areas and link them to individual processes. Sequentially accessing the individual memory blocks makes it possible to ensure that the reception of the data and the writing of the data to the operating memory area take place in a parallel manner, that is to say the writing process is initiated, that is to say started, before the data relating to a current operating function have been completely received. Data which are intended to be written to a first block of the multiplicity of memory blocks can first of all be received and data which are currently stored in the first block of the multiplicity of memory blocks can be simultaneously deleted. The received data are then written to the first block of the multiplicity of memory blocks. During this writing process, the process of receiving the data relating to a current operating function is stopped until the data which are intended to be written to the first block of the multiplicity of memory blocks have been completely written to the first block of the multiplicity of memory blocks. Data which are intended to be written to a second block of the multiplicity of memory blocks can then be received and data which are currently stored in the second block of the multiplicity of memory blocks can be simultaneously deleted. At the same time, such writing of blocks of the data relating to a current operating function opens up the possibility of updating only individual processes of the operating function which are linked to corresponding memory blocks without the need here to update the complete operating function, with the result that this in turn can be implemented in an energy-saving and rapid manner. Furthermore, it is also possible, after a failed update attempt, to update individual processes again without having to completely restart the update process.

In this case, the step of updating the operating function of the sensor may also involve updating validity information of the data relating to a current operating function which are intended to be written to the block of the multiplicity of memory blocks before the data which are currently stored in the block of the multiplicity of memory blocks are completely deleted. Measuring instruments such as sensors can therefore be characterized by their objectivity, their reliability and their validity, these quality criteria each being based on one another. The quality criterion whereby the measured values are independent of the measuring means is called objectivity or interobserver reliability. Good measuring instruments also reliably provide the same measured values from the same objects. This criterion is referred to as reliability or reproducibility. The third quality criterion, the validity, is a measure of whether the data produced during the measurement represent the variable to be measured, as intended. Only then can the data be meaningfully interpreted. In this case, the validity information may comprise, for example, information relating to a memory block to which individual data items have been written and/or information relating to a version of the data. This proves to be advantageous, for example, if only individual processes of the operating function which are linked to the corresponding memory blocks are intended to be updated.

The method may also have the steps of updating validity information relating to the operating function as soon as the received data relating to a current operating function have been completely written to the operating memory area and executing the current operating function. In this case, the time until new program functions or updated program functions can be accessed can be considerably shortened in comparison with conventional update processes without this resulting in a high energy consumption, culminating in the emptying of the energy supply device.

According to another embodiment, the data can be stored in compressed form in this case. The data compression advantageously makes it possible to reduce the quantity of digital data in this case, thus making it possible to considerably reduce the storage space required and the transmission time of the data. The reduced storage space in turn has the advantage that the corresponding sensor module can be configured in a considerably more cost-effective manner.

Another embodiment of the invention also specifies a sensor module. In this case, the sensor module has a sensor for measuring a physical variable, a control module for executing an operating function for controlling the sensor and an interface which interacts with the control module to receive data relating to a current operating function from an external unit. In this case, the control module has a memory which has a boot memory area for storing a boot function and an operating memory area for storing an operating function, and an update module which has an execution unit for executing the boot function, an evaluation unit for checking whether the operating function of the sensor is intended to be updated, a security unit for carrying out a plausibility check if the operating function is intended to be updated, and a writing unit for writing received data relating to a current operating function to the operating memory area. The writing unit is designed in this case to write the received data relating to a current operating function to the operating memory area in parallel with the reception of the data relating to a current operating function.

A boot function is generally understood as meaning special software which is usually loaded from a bootable medium by the firmware of a computer and is then executed. The boot function then loads further parts of an operating system of the computer, usually a kernel. The external unit may also be a special RF communication module, in particular a production or programming station which is connected to the vehicle network in a wired or wireless manner, for example for diagnostic and/or updating purposes during production or in a workshop, and transmits data to individual control devices of the motor vehicle and receives data from the control devices.

Such a sensor module has the advantage that an operating function of the sensor can be updated in said module in an energy-saving and rapid manner. As a result of the fact that the writing unit is designed not to initiate the writing of current data to the operating memory area only when all data relating to a current operating function have been completely received, but rather to start it in parallel with the reception of the data relating to a current operating function, delays caused by the update process can be avoided and the time used during the update can therefore be reduced. This in turn results in a lower energy consumption of the update process, which is associated with an increased service life of an energy supply device for supplying the sensor with electrical energy, in particular in an operating mode of the sensor. The evaluation unit can also be used to ensure that the update process is carried out only when this appears to be necessary. This makes it possible to shorten and accelerate the starting process when loading the operating function of the sensor and to further reduce the energy consumption. The code of the operating function generally does not change and more up-to-date versions for the operating function are not continuously provided, with the result that it is normally not necessary to carry out an update during each starting process. If this is now dispensed with, the starting process is significantly accelerated and the measured value for a sensor can be provided more quickly, for example.

In this case, the sensor module may be a tire sensor module, in particular a tire pressure sensor module. In the case of tire pressure sensors, tire temperature sensors and tire load sensors of tire pressure sensor modules of a motor vehicle in particular, such a control module which is designed to ensure an energy-saving and fast update process, in comparison with control modules for implementing update processes which have a high energy consumption, proves to be advantageous, especially since replacement of the energy supply device proves to be difficult in the case of tire pressure sensor modules since a tire pressure monitoring system, that is to say the tire pressure sensor module, is usually installed inside the tires of a motor vehicle and replacement of the energy supply device would consequently require the corresponding tire to be removed.

Furthermore, it is also possible for the transmission of the data relating to a current operating function to be an encrypted transmission, thus making it possible to further increase the security. The process in which clearly readable data are converted into an "illegible" character string, that is to say a character string which cannot be easily interpreted, with the aid of an encryption method is called encryption. In this case, one or else more keys are used as decisively important parameters of the encryption.

According to one embodiment, the operating memory area consists of a multiplicity of memory blocks in this case, and the writing unit has a deleting unit for deleting data which are currently stored in a block of the multiplicity of memory blocks. The writing unit is also designed to sequentially write blocks of the data relating to a current operating function to the multiplicity of memory blocks in such a manner that, at the same time as reception of data relating to a current operating function which are intended to be written to a block of the multiplicity of memory blocks, the deleting unit deletes data which are currently stored in the block of the multiplicity of memory blocks and the writing unit then writes the data relating to a current operating function which are intended to be stored in the block of the multiplicity of memory blocks. It is known practice to use virtual memory management means which subdivide the physically available memory into memory blocks (organized as pages or segments) or memory areas and link them to individual processes. The control module is therefore designed to ensure sequential access to the individual memory blocks, thus making it possible to ensure that the reception of the data and the writing of the data to the operating memory area take place in a parallel manner, that is to say the writing process is initiated, that is to say started, before the data relating to a current operating function have been completely received. Data which are intended to be written to a first block of the multiplicity of memory blocks can first of all be received and data which are currently stored in the first block of the multiplicity of memory blocks can be simultaneously deleted. The received data are then written to the first block of the multiplicity of memory blocks. During this writing process, the process of receiving the data relating to a current operating function is stopped until the data which are intended to be written to the first block of the multiplicity of memory blocks have been completely written to the first block of the multiplicity of memory blocks. Data which are intended to be written to a second block of the multiplicity of memory blocks can then be received and data which are currently stored in the second block of the multiplicity of memory blocks can be simultaneously deleted. At the same time, such a control module which ensures writing of blocks of the data relating to a current operating function opens up the possibility of updating only individual processes of the operating function which are linked to corresponding memory blocks without the need here to update the complete operating function, with the result that this in turn can be implemented in an energy-saving and rapid manner. Furthermore, it is also possible, after a failed update attempt, to update individual processes again without having to completely restart the update process.

Furthermore, the boot memory area may be part of a firmware module. Firmware is understood as meaning software which is embedded in electronic devices. It is usually stored in a flash memory, an EPROM, EEPROM or ROM and cannot be replaced by the user or can be replaced only using special means or functions. It occupies an intermediate position between hardware (that is to say the physical parts of a device) and the application software (the possibly replaceable programs of a device). Consequently, the boot function may be embedded in the system, that is to say the control module of the sensor module, which has the advantage that the update process can be started without the boot function first of all having to be implemented or transmitted, thus making it possible to save further time when updating the operating function of the sensor. Since, in particular when reprogramming non-volatile program memories, the latter cannot be read, the boot function must be copied in this case, before the boot function is executed, to a main memory, that is to say a volatile memory, which is preferably in the form of RAM (Random Access Memory). A RAM or random access memory is an information memory which is used, in particular, as a main memory, usually in the form of memory modules.

According to another embodiment, the boot memory area may also be part of the operating memory area. This makes it possible to ensure that the boot function can also be updated in addition to the operating function. Since operating functions are usually stored in a non-volatile memory to which there can be no read access, in particular during reprogramming, that is to say during the update process, the boot function must again be copied in this case, before the boot function is executed, to a main memory, that is to say a volatile memory, which is preferably in the form of RAM (Random Access Memory).

Furthermore, it is also possible for the boot function to be part of a software update which is transmitted from the external unit to the control module before the data relating to a current operating function.

The memory of the control module may also have a further non-volatile memory for storing validity information relating to the operating function. Different data memories whose stored information, validity information relating to a currently stored operating function of the sensor in this case, are permanently retained are referred to as non-volatile memories in digital data processing. Measuring instruments such as sensors can therefore be characterized by their objectivity, their reliability and their validity, these quality criteria each being based on one another. The quality criterion whereby the measured values are independent of the measuring means is called objectivity or interobserver reliability. Good measuring instruments also reliably provide the same measured values from the same objects. This criterion is referred to as reliability or reproducibility. The third quality criterion, the validity, is a measure of whether the data produced during the measurement represent the variable to be measured, as intended. Only then can the data be meaningfully interpreted. In this case, the validity information may comprise, for example, information relating to a memory block to which individual data items have been written and/or information relating to a version of the data.

Another aspect of the invention specifies a computer program product which is designed to carry out a method as described above and below when it is executed on a sensor module as described above and below.

The computer program product has the advantages which have already been mentioned in connection with the corresponding embodiments of the method according to the invention and the sensor module according to the invention and are not stated again at this juncture in order to avoid repetitions.

Another embodiment of the invention additionally also specifies a vehicle, in particular a motor vehicle, which has a tire pressure sensor module described above. In the case of tire pressure sensors of tire pressure sensor modules of a motor vehicle in particular, such a control module which is designed to ensure an energy-saving and fast update process, in comparison with control modules for implementing update processes which have a high energy consumption, proves to be advantageous, especially since replacement of the energy supply device proves to be difficult in the case of tire pressure sensor modules since a tire pressure monitoring system, that is to say the tire pressure sensor module, is usually installed inside the tires of the motor vehicle and replacement of the energy supply device would consequently require the corresponding tire to be removed.

In summary, it can be stated that the present invention states a method for updating a fixed operating function of a sensor, the update process being able to be carried out in an energy-saving and rapid manner since reception of data relating to a current operating function and writing of the data relating to a current operating function to an operating memory area of a memory of the sensor take place in a parallel manner.

In the case of tire pressure sensors in particular, this proves to be advantageous, especially since replacement of the energy supply device proves to be difficult in the case of tire pressure sensor modules since tire pressure sensor modules are usually installed inside the tires of a motor vehicle and replacement of the energy supply device would consequently require the corresponding tire to be removed.

Since the received data relating to a current operating function are preferably sequentially written in blocks in this case, it is also possible for only individual processes of the operating function to also be able to be updated without having to carry out a complete update process of the operating function of the sensor.

The invention is now explained in more detail using the accompanying figures.

DESCRIPTION OF THE INVENTION

Figure 1:
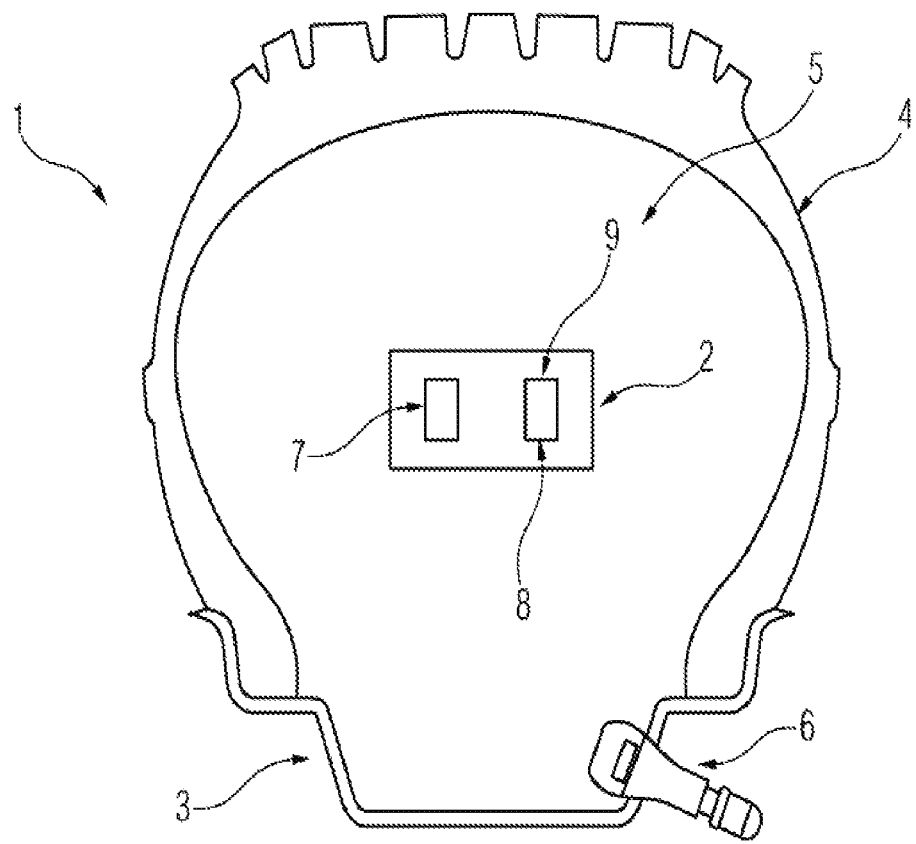
FIG. 1 shows a schematic cross-sectional view of a vehicle wheel having a tire pressure sensor module.

FIG. 1 shows a schematic cross-sectional view of a vehicle wheel 1 having a tire pressure sensor module 2.

FIG. 1 shows a cross section of a vehicle wheel 1 of a vehicle in the shown embodiment of a motor vehicle, the vehicle wheel 1 being braked with respect to a chassis (not shown in FIG. 1) of the motor vehicle, for example with the aid of a disk brake. The illustrated vehicle wheel 1 consists substantially of a wheel rim 3 and a mounted tire 4 having at least one elastic material, a compressed air chamber 5 being formed between the tire 4 and the wheel rim 3 and being able to be vented and ventilated by means of a tire valve 6 releasably accommodated in a valve seat of the wheel rim 3.

FIG. 1 also shows an apparatus for recording and transmitting a tire air pressure which is arranged in the compressed air chamber 5, that is to say a tire pressure sensor module 2 which comprises a tire pressure sensor 7 designed to determine a gas pressure of a gas which is in the compressed air chamber 5 and forms a tire filling gas, for example air or nitrogen. The tire pressure sensor module 2 is part of a tire sensor module which is also referred to as a wheel unit (WU) and is, for example, part of a tire pressure monitoring system (TPMS) of the vehicle. The tire pressure sensor module 2 can be arranged in the vehicle wheel 1, for example on an inner surface of the tire 4 opposite a tread of the tire 4 or on the tire valve 6.

In this case, the tire pressure sensor module 2 transmits values for a tire air pressure from the compressed air chamber 5 to a control device (not shown in FIG. 1) of the motor vehicle via a coded radio-frequency transmission path. These data are then evaluated in the control device, and pressure losses in individual tires and also slow pressure losses in all tires, for example on account of diffusion through the rubber, can be detected, in particular.

It can also be seen that the tire pressure sensor module 2 is supplied with electrical energy by an energy supply device 8. The energy supply device 8 shown in FIG. 1 is a battery 9 in this case.

However, in such tire pressure sensor modules 2, it proves to be disadvantageous that updating of the software of the tire pressure sensor 7, that is to say of an operating function of the tire pressure sensor 7, for example in order to add or update particular program functions, is associated with a high energy consumption, which, in the case of a long-lasting update process, may culminate in the energy supply device 8 being emptied. However, replacing the energy supply device 8 is associated with a comparatively very large amount of effort, on account of the installation situation of the tire pressure sensor module 2, compared with the benefit achieved by the sensor.

The update process is usually carried out in this case by receiving data relating to a current operating function from an external unit and then storing the received data in, that is to say writing the received data to an operating memory area of the tire pressure sensor module 2. However, since all data relating to the current operating function are first of all received in this case before the writing process starts, such an update process results in delays and, in particular, a long update period, which in turn has a negative effect on the energy consumption.

Figure 2:
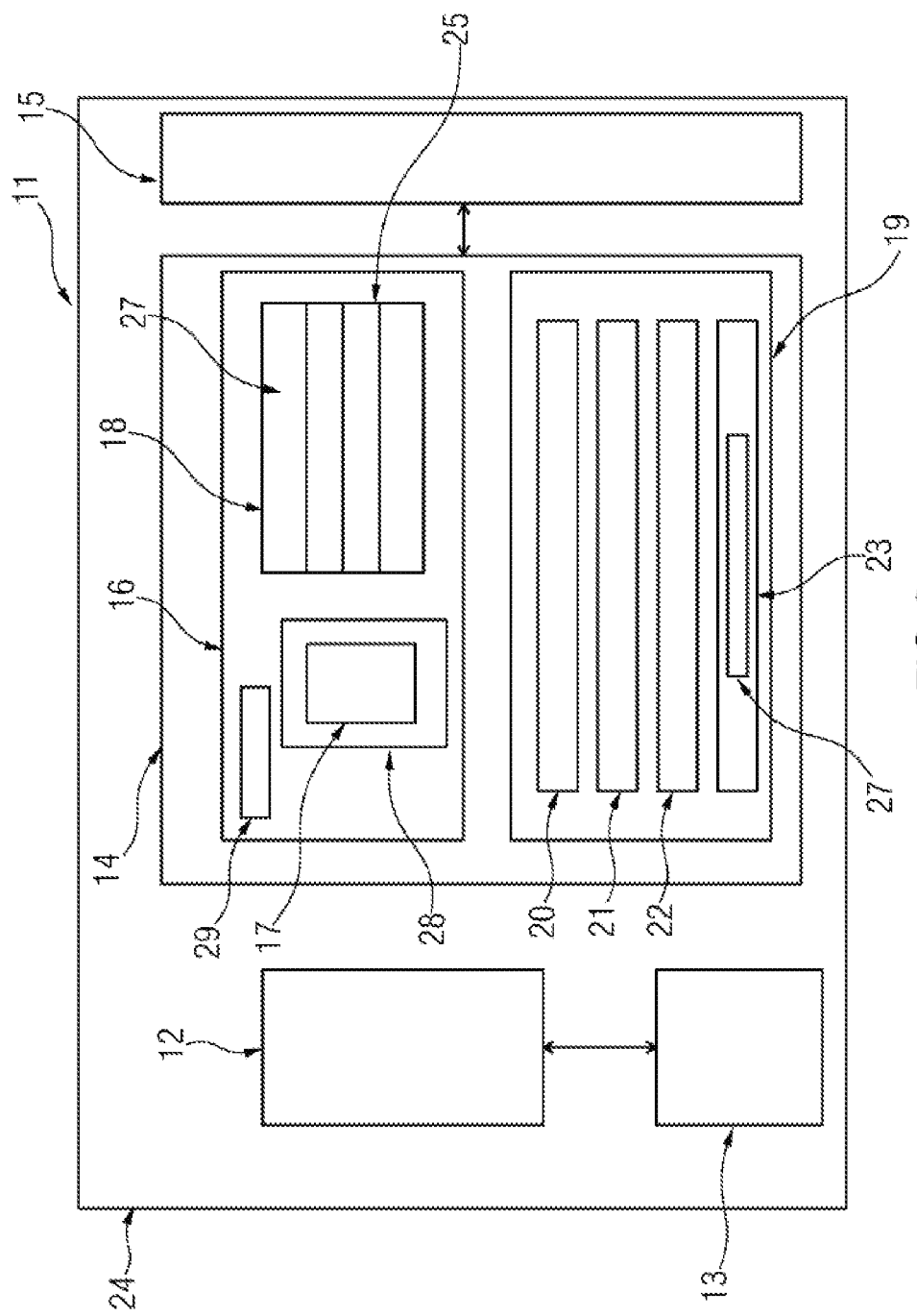
FIG. 2 shows a schematic block diagram of a sensor module according to embodiments of the invention.

FIG. 2 shows a schematic block diagram of a sensor module 11 according to embodiments of the invention.

As FIG. 2 shows, the sensor module 11 has a sensor 12 for measuring a physical variable, an energy supply device 13 for supplying the sensor 12 with electrical energy, a control module 14 for executing an operating function for controlling the sensor 12, and an interface 15 which interacts with the control module 14 to receive data relating to a current operating function from an external unit not shown in FIG. 2.

In this case, the control module 14 illustrated has a memory 16 which has a boot memory area 17 for storing a boot function and an operating memory area 18 for storing an operating function, as well as an update module 19. The update module 19 in turn has an execution unit 20 for executing the boot function, an evaluation unit 21 for checking whether the operating function of the sensor 12 is intended to be updated, a security unit 22 for carrying out a plausibility check if the operating function is intended to be updated, and a writing unit 23 for writing received data relating to a current operating function to the operating memory area, the writing unit 23 being designed to write the received data relating to a current operating function to the operating memory area in parallel with the reception of the data relating to a current operating function.

A boot function is generally understood as meaning special software which is usually loaded from a bootable medium by the firmware of a computer and is then executed. The boot function then loads further parts of an operating system of the computer, usually a kernel. The external unit may also be a special RF communication module, in particular a production or programming station which is connected to the vehicle network in a wired or wireless manner, for example for diagnostic and/or updating purposes during production or in a workshop, and transmits data to individual control devices of the motor vehicle and receives data from the control devices.

Such a sensor module 11 has the advantage that an operating function of the sensor 12 can be updated in said module in an energy-saving and rapid manner. As a result of the fact that the writing unit 23 is designed not to initiate the writing of current data to the operating memory area only when all data relating to a current operating function have been completely received, but rather to start it in parallel with the reception of the data relating to a current operating function, delays caused by the update process can be avoided and the time used during the update can therefore be reduced.

The sensor module 11 in FIG. 2 is, for example, a tire sensor module 24, in particular a tire pressure sensor module. Such a sensor module 11 proves to be advantageous for tire sensors, in particular. In this case, the tire sensor module 24 is also referred to as a wheel unit (WU) and, for example, is part of a tire pressure monitoring system (TPMS) of the vehicle. The tire sensor module 24 can be arranged in a vehicle wheel, for example on an inner surface of the tire opposite a tread of a tire of the vehicle wheel or on a tire valve.

The sensor 12 is, for example, in the form of a tire pressure sensor designed to determine a gas pressure of a gas which is in an interior of the tire and forms a tire filling gas, for example air or nitrogen. Furthermore, the sensor 12 may be, for example, in the form of a temperature sensor for determining a current tire temperature and/or in the form of a tire load sensor for determining a current tire load.

It can also be seen that the operating memory area 18 consists of a multiplicity of memory blocks 25. The writing unit 23 in FIG. 2 also has a deleting unit 26 for deleting data which are currently stored in a block of the multiplicity of memory blocks 25. In this case, the writing unit 23 is designed to sequentially write blocks of the data relating to a current operating function to the multiplicity of memory blocks 25 in such a manner that, at the same time as reception of data relating to a current operating function which are intended to be written to a block 27 of the multiplicity of memory blocks 25, the deleting unit 26 deletes data which are currently stored in the block 27 of the multiplicity of memory blocks 25 and the writing unit 23 then writes the data relating to a current operating function which are intended to be stored in the block 27 of the multiplicity of memory blocks 25. The control module 14 according to FIG. 2 is consequently designed to ensure sequential access to the individual memory blocks, thus making it possible to ensure that the reception of the data and the writing of the data to the operating memory area take place in a parallel manner, that is to say the writing process is initiated, that is to say started, before the data relating to a current operating function have been completely received.

According to the embodiment in FIG. 2, the boot memory area 17 is also part of a firmware module 28. Firmware is understood as meaning software which is embedded in electronic devices. It is usually stored in a flash memory, an EPROM, EEPROM or ROM and cannot be replaced by the user or can be replaced only using special means or functions. It occupies an intermediate position between hardware (that is to say the physical parts of a device) and the application software (the possibly replaceable programs of a device). In this case, it should be noted that, in particular when reprogramming non-volatile program memories, the latter cannot be read, with the result that the boot function must be copied in this case, before the boot function is executed, to a main memory, that is to say a volatile memory, which is preferably in the form of RAM (Random Access Memory). However, the boot memory area may also be part of the operating memory area, with the result that the boot function can therefore likewise be updated. It is also possible for the boot function to be part of a software update which is transmitted from the external unit to the control module before the data relating to a current operating function.

As can also be seen, the memory 16 also has a non-volatile memory 29 for storing validity information relating to the operating function. In this case, the validity information may comprise, for example, information relating to a memory block to which individual data items have been written, and/or information relating to a version of the data.

Figure 3:
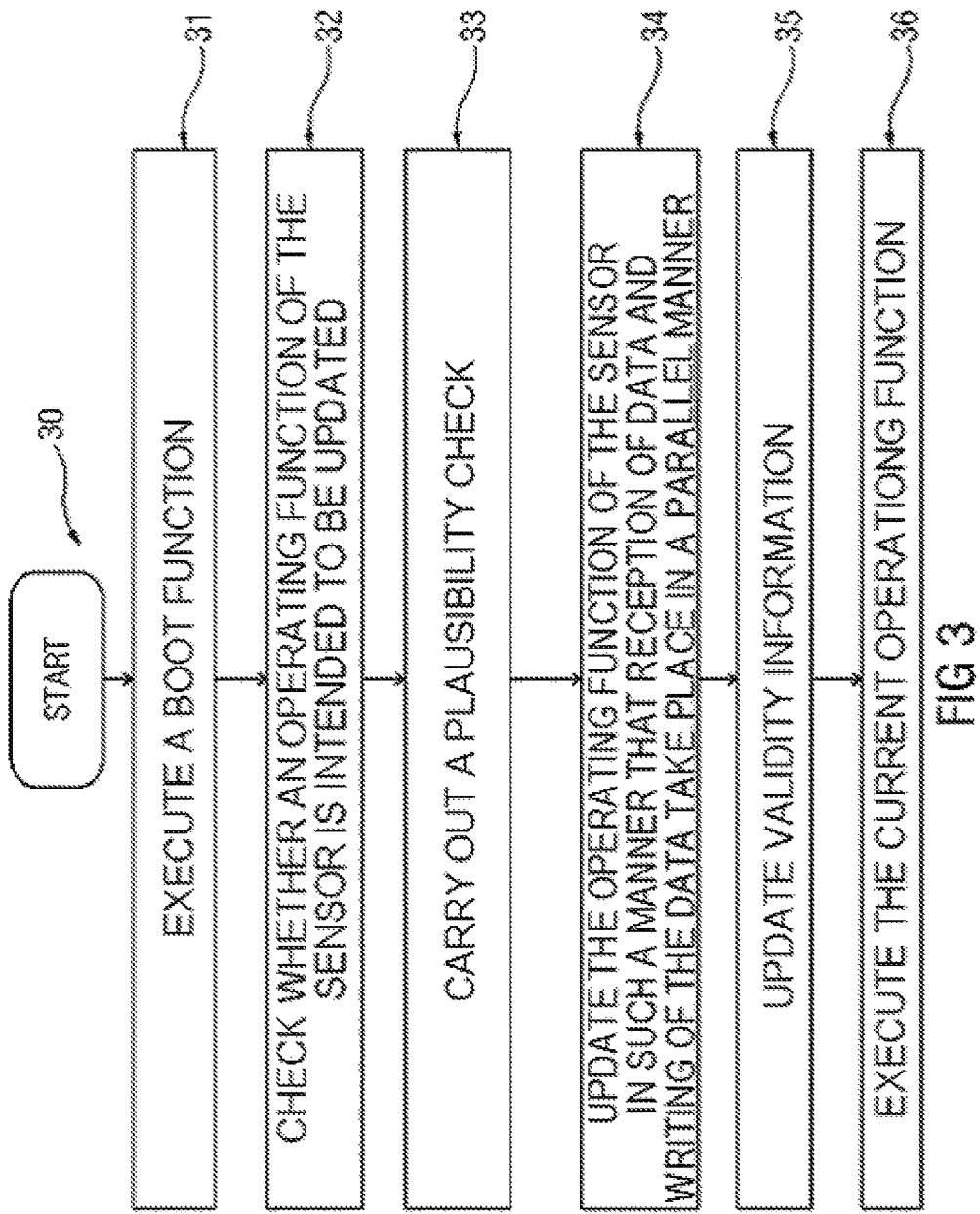
FIG. 3 shows a flowchart of a method for updating an operating function of a sensor according to embodiments of the invention.

FIG. 3 shows a flowchart of a method 30 for updating an operating function of a sensor having a memory which has a boot memory area for storing a boot function and an operating memory area for storing an operating function according to embodiments of the invention.

As shown in FIG. 3, the method 30 has the following steps in this case: in a first step 31, a boot function is first of all executed and, in a further step 32, a check is carried out in order to determine whether the operating function of the sensor is intended to be updated. If the operating function of the sensor is intended to be updated, a plausibility check is carried out in a step 33. If the plausibility check was successful, the operating function of the sensor is then updated in a subsequent step 34 in such a manner that data relating to a current operating function are received from an external unit and are written to the operating memory area, the reception of the data and the writing of the data to the operating memory area taking place in a parallel manner.

A boot function is generally understood as meaning special software which is usually loaded from a bootable medium by the firmware of a computer and is then executed. The boot function then loads further parts of an operating system of the computer, usually a kernel. The external unit may also be a special RF communication module, in particular a production or programming station which is connected to the vehicle network in a wired or wireless manner, for example for diagnostic and/or updating purposes during production or in a workshop, and transmits data to individual control devices of the motor vehicle and receives data from the control devices.

According to the embodiment in FIG. 3, the sensor is again a tire pressure sensor of a motor vehicle, for example.

The boot function may also be started from the external unit.

According to the embodiments in FIG. 3, the step 33 of carrying out a plausibility check involves carrying out an authentication check and a compatibility check.

Furthermore, the operating memory area according to the embodiments in FIG. 3 is constructed from a multiplicity of memory blocks. The step 34 of updating the operating function of the sensor in this case involves sequentially writing blocks of the data relating to the current operating function to the multiplicity of memory blocks in such a manner that data relating to a current operating function which are intended to be written to a block of the multiplicity of memory blocks are received and data which are currently stored in the block of the multiplicity of memory blocks are simultaneously deleted and data relating to a current operating function which are intended to be written to the block of the multiplicity of memory blocks are then written to the block of the multiplicity of memory blocks. This makes it possible to ensure that the reception of the data and the writing of the data to the operating memory area take place in a parallel manner.

In this case, it is possible for the step 34 of updating the operating function of the sensor to also have a step of updating validity information of the data relating to a current operating function which are intended to be written to the block of the multiplicity of memory blocks before the data which are currently stored in the block of the multiplicity of memory blocks are completely deleted.

FIG. 3 also shows the step 35 of updating validity information relating to the operating function as soon as the received data relating to a current operating function have been completely written to the operating memory area, and the step 36 of subsequently executing the current operating function.

According to the embodiment in FIG. 3, the step 34 of updating the operating function of the sensor also comprises compressed storage of the received data.

LIST OF REFERENCE SYMBOLS

1 Vehicle wheel
2 Tire pressure sensor module
3 Wheel rim
4 Tire
5 Compressed air chamber
6 Tire valve
7 Tire pressure sensor
8 Energy supply device
9 Battery
11 Sensor module
12 Sensor
13 Energy supply device
14 Control module
15 Interface
16 Memory
17 Boot memory area
18 Operating memory area
19 Update module
20 Execution unit
21 Evaluation unit
22 Security unit
23 Writing unit
24 Tire sensor module
25 Multiplicity of memory blocks
26 Deleting unit
27 Memory block
28 Firmware module
29 Non-volatile memory 30 Method
31 Method step
32 Method step
33 Method step
34 Method step
35 Method step
36 Method step

The invention claimed is:

1. A method for updating an operating function of a sensor of a sensor module located in a vehicle wheel, the sensor module including the sensor, an interface, a memory with a boot memory area for storing a boot function, and an operating memory area for storing an operating function, the method comprising the following steps:
executing the boot function that is stored in the boot memory area of the memory of the sensor module;
checking whether an update of the operating function of the sensor is intended to be performed;
if an update of the operating function of the sensor is intended to be performed, carrying out a plausibility check;
if the plausibility check is successful, updating the operating function of the sensor by receiving data relating to a current operating function into the interface of the sensor module from an external unit and writing the data to the operating memory area, wherein receiving the data and writing the data to the operating memory area take place in parallel;
updating validity information relating to the operating function as soon as the received data relating to a current operating function have been completely written to the operating memory area; and
executing the current operating function.

2. The method according to claim 1, wherein the sensor is selected from the group consisting of a tire pressure sensor, a tire temperature sensor and a tire load sensor of a vehicle.

3. The method according to claim 1, which comprises starting the boot function from the external unit.

4. The method according to claim 1, wherein the step of carrying out the plausibility check comprises carrying out an authentication check and a compatibility check.

5. The method according to claim 1, wherein the operating memory area comprises a multiplicity of memory blocks, and the updating of the operating function of the sensor comprises sequentially writing blocks of the data relating to the current operating function to the multiplicity of memory blocks so that data relating to a current operating function which are intended to be written to a block of the multiplicity of memory blocks are received and data which are currently stored in the block of the multiplicity of memory blocks are deleted at the same time and data relating to a current operating function which are intended to be written to the block of the multiplicity of memory blocks are then written to the block of the multiplicity of memory blocks.

6. The method according to claim 5, wherein the updating of the operating function of the sensor further comprises the following step: updating validity information of the data relating to a current operating function which are intended to be written to the block of the multiplicity of memory blocks before the data which are currently stored in the block of the multiplicity of memory blocks are completely deleted.

7. The method according to claim 1, further comprising:
updating validity information relating to the operating function as soon as the received data relating to a current operating function have been completely written to the operating memory area; and
executing the current operating function.

8. The method according to claim 1, which comprises storing the received data in compressed form.

9. A computer program product, comprising executable instructions in non-transitory form and configured to carry out a method according to claim 1.

10. The method according to claim 1, wherein the step of updating the operating function of the sensor includes adding at least one program function.

11. A sensor module, comprising:
a sensor for measuring a physical variable;
a control module for executing an operating function for controlling said sensor;
an interface configured to interact with said control module to receive data relating to a current operating function from an external unit;
said control module having a memory with a boot memory area for storing a boot function and an operating memory area for storing an operating function of said sensor; and
an update module having an execution unit for executing the boot function, an evaluation unit for checking whether an update for the operating function of the sensor is intended to be performed, a security unit configured for performing a plausibility check if an update for the operating function of the sensor is intended to be performed, and a writing unit for writing received data relating to a current operating function to the operating memory area;
said writing unit being configured to write the received data relating to the current operating function to said operating memory area in parallel with receiving the data relating to the current operating function;
wherein said sensor, said control module, said interface, and said update module are located within said sensor module;
said memory including a non-volatile memory for storing validity information relating to the operating function, the validity information relating to the operating function being updated in said non-volatile memory as soon as the received data relating to the current operating function have been completely written to said operating memory area and before the current operating function is executed.

12. The sensor module according to claim 11, configured as a tire sensor module.

13. The sensor module according to claim 11, wherein said operating memory area is formed of a multiplicity of memory blocks, and said writing unit includes a deleting unit for deleting data which are currently stored in a block of said multiplicity of memory blocks and is configured to sequentially write blocks of the data relating to a current operating function to said multiplicity of memory blocks so that, contemporaneously with receiving data relating to a current operating function which are intended to be written to a block of the multiplicity of memory blocks, the deleting unit deletes data which are currently stored in the block of said multiplicity of memory blocks and said writing unit then writes the data relating to a current operating function which are intended to be stored in the block of said multiplicity of memory blocks.

14. The sensor module according to claim 11, wherein said boot memory area is part of a firmware module.

15. The sensor module according to claim 11, wherein said boot memory area is part of said operating memory area.

16. The sensor module according to claim 11, wherein said memory further comprises a non-volatile memory for storing validity information relating to the operating function.

17. The sensor module according to claim 11, comprising a computer program in non-transitory form with executable instructions configured to carry out a method for updating the operating function of the sensor when executed by the sensor module, the method including steps of:
- executing the boot function;
- checking whether the operating function of the sensor is intended to be updated;
- in response to determining that the operating function of the sensor is intended to be updated, carrying out a plausibility check; and
- when the plausibility check is successful, updating the operating function of the sensor by receiving data relating to a current operating function from an external unit and writing the data to the operating memory area, wherein receiving the data and writing the data to the operating memory area take place in parallel.

* * * * *